(12) United States Patent
Kim et al.

(10) Patent No.: US 10,776,542 B2
(45) Date of Patent: Sep. 15, 2020

(54) METHOD AND DEVICE FOR CALIBRATING PHYSICS ENGINE OF VIRTUAL WORLD SIMULATOR TO BE USED FOR LEARNING OF DEEP LEARNING-BASED DEVICE, AND A LEARNING METHOD AND LEARNING DEVICE FOR REAL STATE NETWORK USED THEREFOR

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/723,450

(22) Filed: Dec. 20, 2019

(65) Prior Publication Data
US 2020/0242289 A1 Jul. 30, 2020

Related U.S. Application Data

(60) Provisional application No. 62/798,691, filed on Jan. 30, 2019.

(51) Int. Cl.
*G06F 30/27* (2020.01)
*G06K 9/62* (2006.01)
(Continued)

(52) U.S. Cl.
CPC .......... *G06F 30/27* (2020.01); *G06K 9/6256* (2013.01); *G06K 9/6262* (2013.01); *G06N 3/04* (2013.01); *G06N 3/08* (2013.01); *G06F 2111/10* (2020.01)

(58) Field of Classification Search
None
See application file for complete search history.

(56) References Cited

U.S. PATENT DOCUMENTS

2017/0243083 A1* 8/2017 Wang ................. G06K 9/00711
2018/0096259 A1* 4/2018 Andrews ................ G06N 20/00
(Continued)

OTHER PUBLICATIONS

Du et al. "Learning physics priors for deep reinforcement learning", Dec. 20, 2018, Accessed at https://openreview.net/forum?id=SkIrrhRqFX (Year: 2018).*
(Continued)

*Primary Examiner* — Suzanne Lo
(74) *Attorney, Agent, or Firm* — Kaplan Breyer Schwarz, LLP

(57) ABSTRACT

A method for calibrating a physics engine of a virtual world simulator for learning of a deep learning-based device is provided. The method includes steps of a calibrating device (a) if virtual current frame information corresponding to a virtual current state in virtual environment is acquired, (i)
(Continued)

transmitting the virtual current frame information to the deep learning-based device to output virtual action information, (ii) transmitting the virtual current frame information and the virtual action information to the physics engine to output virtual next frame information corresponding to the virtual current frame information and the virtual action information, and (iii) transmitting the virtual current frame information and the virtual action information to a real state network learned to output predicted next frame information in response to action in a real environment to output predicted real next frame information; and (b) optimizing the previous calibrated parameters to generate current calibrated parameters.

22 Claims, 5 Drawing Sheets

(51) Int. Cl.
  *G06N 3/08* (2006.01)
  *G06N 3/04* (2006.01)
  *G06F 111/10* (2020.01)

(56) References Cited

U.S. PATENT DOCUMENTS

2018/0293711 A1\* 10/2018 Vogels ..................... G06N 3/08
2019/0019087 A1\* 1/2019 Fukui ................. G06K 9/00791
2019/0303759 A1\* 10/2019 Farabet ............. G06K 9/00791

OTHER PUBLICATIONS

Anonymous Authors, Learning Physics Priors for Deep Reinforcement Learning, Nov. 20, 2018, Under review as a conference paper ICLR 2019 openreview.net, pp. 1-17, Section 3; Figure 2; Section 2.

Extended European Search Report dated Jun. 16, 2020 in EP Patent Application No. 20152427.9.

Felix Leibfried et al, A Deep Learning Approach for Joint Video Frame and Reward Prediction in Atari Games, Aug. 17, 2017, XP055701676, pp. 1-18, Figure 1; Section 3, https://arxiv.org/abs/1611.07078, Jun 5, 2020.

\* cited by examiner

METHOD AND DEVICE FOR CALIBRATING PHYSICS ENGINE OF VIRTUAL WORLD SIMULATOR TO BE USED FOR LEARNING OF DEEP LEARNING-BASED DEVICE, AND A LEARNING METHOD AND LEARNING DEVICE FOR REAL STATE NETWORK USED THEREFOR

CROSS REFERENCE TO RELATED APPLICATION

This application claims the benefit of priority to U.S. Provisional Patent Application No. 62/798,691, filed on Jan. 30, 2019, the entire contents of which are incorporated herein by reference.

FIELD OF THE DISCLOSURE

The present disclosure relates to a virtual world simulator to be used for learning of a deep learning-based device; and more particularly, to the method and the device for calibrating a physics engine of a virtual world simulator to be used for learning of the deep learning-based device by using a real state network capable of modeling a next state in a real world, and a learning method and a learning device for real state network used therefor.

BACKGROUND OF THE DISCLOSURE

Deep learning-based devices, such as autonomous vehicles, generally determine the next action to be taken by a short-term planning based on information from several frames to dozens of frames of recent images inputted.

For example, in the case of the autonomous vehicles, based on segmentation images or meta data like bounding boxes and left/right direction of detected objects, which are information obtained from each frame, actions of three dimensional real-valued vectors, i.e., (i) an amount of change in a steering angle, (ii) a pressure on a brake pedal, (iii) a pressure on an accelerator pedal, are outputted, and accordingly, the autonomous vehicles will autonomously drive themselves in response to the actions.

This deep learning-based device should be learned to determine appropriate actions according to the input state, and there are various learning methods, but currently, on-policy reinforcement learning is generally used.

Also, the deep learning-based device can be learned in a real world, but it is difficult to acquire diversified training data, and it is time-consuming and costly.

Therefore, a method for learning the deep learning-based devices in a virtual world has been proposed.

However, when learning in the virtual world, there is a problem in a reliability of the learning results due to a gap between virtual environment and real environment.

For example, in case of the deep learning-based device is an autonomous vehicle, the physics engine of a virtual world simulator may be configured to output "a next state with a changed velocity, a location, and surroundings of the vehicle" if "actions of rotating a steering wheel by a certain angle and stepping on the brake pedal with a certain pressure" are taken in response to "a state of a current velocity and its surroundings", thereby learning the autonomous vehicle.

However, the larger a discrepancy between the next state created by the physics engine of the virtual world simulator and the next state of a real world is, the less optimal the optimal action having been learned in the virtual world is in the real world.

For example, in the case of the autonomous vehicle, the vehicle has learned a proper action that can avoid an accident in a dangerous situation in the virtual world, but nevertheless an accident in the real world occurs even though the vehicle takes the proper action in a same situation.

SUMMARY OF THE DISCLOSURE

It is an object of the present disclosure to solve all the aforementioned problems.

It is another object of the present disclosure to allow a physics engine of a virtual world simulator to output a next state that minimizes a gap between a virtual world and a real world.

It is still another object of the present disclosure to calibrate the physics engine of the virtual world simulator such that the virtual world more closely mimics the real world.

In accordance with one aspect of the present disclosure, there is provided a method for calibrating a physics engine of a virtual world simulator to be used for learning of a deep learning-based device, including steps of: (a) if virtual current frame information corresponding to a virtual current state in a virtual environment is acquired from the virtual world simulator, a calibrating device performing (i) a process of transmitting the virtual current frame information to the deep learning-based device, to thereby instruct the deep learning-based device to apply its operation using previous learned parameters to the virtual current frame information, and thus to output virtual action information corresponding to the virtual current frame information, (ii) a process of transmitting the virtual current frame information and the virtual action information to the physics engine of the virtual world simulator, to thereby instruct the physics engine to apply its operation using previous calibrated parameters to the virtual current frame information and the virtual action information, and thus to output virtual next frame information corresponding to the virtual current frame information and the virtual action information, and (iii) a process of transmitting the virtual current frame information and the virtual action information to a real state network which has been learned to output multiple pieces of predicted next frame information in response to real action information on a real action performed in multiple pieces of real recent frame information by the deep learning-based device in a real environment, to thereby instruct the real state network to apply its operation using learned prediction parameters to the virtual action information and multiple pieces of the virtual recent frame information corresponding to the virtual current frame information and thus to output predicted real next frame information; and (b) the calibrating device performing a process of calibrating and optimizing the previous calibrated parameters of the physics engine, such that at least one loss is minimized which is created by referring to the virtual next frame information and the predicted real next frame information, to thereby generate current calibrated parameters as optimized parameters.

As one example, the method further comprises a step of: (c) the calibrating device performing a process of transmitting the virtual next frame information and reward information corresponding to the virtual action information to the deep learning-based device, to thereby instruct the deep learning-based device to update the previous learned parameters via on-policy reinforcement learning which uses the virtual next frame information and the reward information.

As one example, in the process of (iii) at the step of (a), the calibrating device performs a process of transmitting the virtual current frame information and the virtual action information to the real state network, to thereby instruct the real state network to generate the multiple pieces of the virtual recent frame information by referring to the virtual current frame information and k pieces of virtual previous frame information received beforehand.

As one example, at the process of (iii), the calibrating device performs a process of transmitting the virtual current frame information and the virtual action information to the real state network, to thereby instruct the real state network to (iii-1) (iii-1-1) generate a 1-st dimension vector by applying convolution operation to a virtual current frame state sum created by concatenating the virtual current frame information and the k pieces of the virtual previous frame information and (iii-1-2) generate a 2-nd dimension vector by applying fully-connected operation to the virtual action information, and (iii-2) generate the predicted real next frame information by applying deconvolution operation to a concatenation of the 1-st dimension vector and the 2-nd dimension vector.

As one example, the virtual current frame state sum is an H×W×(K+1) tensor created by concatenating (i) the k pieces of the virtual previous frame information and (ii) the virtual current frame information which is an H×W×C tensor, wherein the 1-st dimension vector is an HWC-dimension vector, and wherein, supposing that the 2-nd dimension vector is an L-dimension vector, the predicted real next frame information is an H×W×C tensor created by applying deconvolution operation to a 1×1×(HWC+L) tensor generated by concatenating the 1-st dimension vector and the 2-nd dimension vector.

As one example, at the step of (b), the calibrating device repeats, until the loss decreases, (i) a process of selecting one previous calibrated parameter among the previous calibrated parameters (ii) a process of calibrating the selected one previous calibrated parameter with a preset learning rate by using the loss, to thereby generate one current calibrated parameter as an optimized parameter, and (iii) (iii-1) a process of instructing the physics engine to apply its operation using said one current calibrated parameter and a rest of the previous calibrated parameters excluding said one previous calibrated parameter to the virtual current frame information and the virtual action information, to thereby generate new virtual next frame information and (iii-2) a process of determining whether the loss decreases by using at least one new loss created by referring to the new virtual next frame information and the predicted real next frame information.

As one example, if the loss is determined as not decreased for any of the previous calibrated parameters, the calibrating device decreases the preset learning rate and performs said process (i), said process (ii), and said process (iii).

In accordance with another aspect of the present disclosure, there is provided a method for learning a real state network capable of generating predicted next frame information corresponding to real action information on a real action performed in multiple pieces of real recent frame information by a deep learning-based device in a real environment, including steps of: (a) if multiple pieces of trajectory information corresponding to multiple pieces of the real action information on the real action performed by the deep learning-based device in the real environment are acquired as training data, a learning device performing a process of generating multiple pieces of recent frame information for training by referring to k pieces of previous real frame information and real current frame information at a point of time in specific trajectory information; (b) the learning device performing a process of inputting into the real state network the multiple pieces of the recent frame information for training and action information for training which is acquired by referring to real current action information of the specific trajectory information at the point of the time, to thereby allow the real state network to apply its operation using prediction parameters to the multiple pieces of the recent frame information for training and the action information for training and thus to output the predicted next frame information; and (c) the learning device performing a process of updating the prediction parameters such that the loss is minimized, by using at least one loss created by referring to the predicted next frame information and real next frame information which is next to the real current frame information in the specific trajectory information.

As one example, at the step of (b), the learning device performs (i) a process of inputting a current frame state sum for training created by concatenating the multiple pieces of the recent frame information for training into a convolutional neural network of the real state network, to thereby allow the convolutional neural network to output a 1-st feature by applying convolution operation to the current frame state sum for training and a process of inputting the action information for training into at least one fully connected layer of the real state network, to thereby allow said at least one fully connected layer to output a 2-nd feature by applying fully-connected operation to the action information for training and (ii) a process of inputting a concatenated feature created by concatenating the 1-st feature and the 2-nd feature into a deconvolutional layer, to thereby allow the deconvolutional layer to output the predicted next frame information by applying deconvolution operation to the concatenated feature.

As one example, the learning device performs a process of instructing the convolutional neural network to output the current frame state sum for training, which is an H×W×(K+1) tensor created by concatenating the multiple pieces of the recent frame information for training which are H×W×C tensors, as the 1-st feature which is an HWC-dimension vector, a process of instructing said at least one fully connected layer to output the action information for training, which is a 3-dimension vector, as the 2-nd feature which is an L-dimension vector, and a process of instructing the deconvolutional layer to output a 1×1×(HWC+L) tensor, created by concatenating the 1-st feature and the 2-nd feature, as the predicted next frame information which is an H×W×C tensor.

As one example, the learning device performs a process of updating at least one parameter of at least one of the convolutional neural network, said at least one fully connected layer, and the deconvolutional layer according to a gradient descent using the loss.

In accordance with still another aspect of the present disclosure, there is provided a calibrating device for calibrating a physics engine of a virtual world simulator to be used for learning of a deep learning-based device, including: at least one memory that stores instructions; and at least one processor configured to execute the instructions to perform or support another device to perform: (I) if virtual current frame information corresponding to a virtual current state in a virtual environment is acquired from the virtual world simulator, (i) a process of transmitting the virtual current frame information to the deep learning-based device, to thereby instruct the deep learning-based device to apply its operation using previous learned parameters to the virtual current frame information, and thus to output virtual action information corresponding to the virtual current frame information, (ii) a process of transmitting the virtual current frame information and the virtual action information to the physics engine of the virtual world simulator, to thereby instruct the physics engine to apply its operation using previous calibrated parameters to the virtual current frame information and the virtual action information, and thus to output virtual next frame information corresponding to the virtual current frame information and the virtual action information, and (iii) a process of transmitting the virtual current frame information and the virtual action information to a real state network which has been learned to output multiple pieces of predicted next frame information in response to real action information on a real action performed in multiple pieces of real recent frame information by the deep learning-based device in a real environment, to thereby instruct the real state network to apply its operation using learned prediction parameters to the virtual action information and multiple pieces of the virtual recent frame information corresponding to the virtual current frame information and thus to output predicted real next frame information, and (II) a process of calibrating and optimizing the previous calibrated parameters of the physics engine, such that at least one loss is minimized which is created by referring to the virtual next frame information and the predicted real next frame information, to thereby generate current calibrated parameters as optimized parameters.

As one example, the processor further performs: (III) a process of transmitting the virtual next frame information and reward information corresponding to the virtual action information to the deep learning-based device, to thereby instruct the deep learning-based device to update the previous learned parameters via on-policy reinforcement learning which uses the virtual next frame information and the reward information.

As one example, in the process of (iii), the processor performs a process of transmitting the virtual current frame information and the virtual action information to the real state network, to thereby instruct the real state network to generate the multiple pieces of the virtual recent frame information by referring to the virtual current frame information and k pieces of virtual previous frame information received beforehand.

As one example, at the process of (iii), the processor performs a process of transmitting the virtual current frame information and the virtual action information to the real state network, to thereby instruct the real state network to (iii-1) (iii-1-1) generate a 1-st dimension vector by applying convolution operation to a virtual current frame state sum created by concatenating the virtual current frame information and the k pieces of the virtual previous frame information and (iii-1-2) generate a 2-nd dimension vector by applying fully-connected operation to the virtual action information, and (iii-2) generate the predicted real next frame information by applying deconvolution operation to a concatenation of the 1-st dimension vector and the 2-nd dimension vector.

As one example, the virtual current frame state sum is an $H \times W \times (K+1)$ tensor created by concatenating (i) the k pieces of the virtual previous frame information and (ii) the virtual current frame information which is an $H \times W \times C$ tensor, wherein the 1-st dimension vector is an HWC-dimension vector, and wherein, supposing that the 2-nd dimension vector is an L-dimension vector, the predicted real next frame information is an $H \times W \times C$ tensor created by applying deconvolution operation to a $1 \times 1 \times (HWC+L)$ tensor generated by concatenating the 1-st dimension vector and the 2-nd dimension vector.

As one example, at the process of (II), the processor repeats, until the loss decreases, (II-1) a process of selecting one previous calibrated parameter among the previous calibrated parameters (II-2) a process of calibrating the selected one previous calibrated parameter with a preset learning rate by using the loss, to thereby generate one current calibrated parameter as an optimized parameter, and (II-3) (II-3a) a process of instructing the physics engine to apply its operation using said one current calibrated parameter and a rest of the previous calibrated parameters excluding said one previous calibrated parameter to the virtual current frame information and the virtual action information, to thereby generate new virtual next frame information and (II-3b) a process of determining whether the loss decreases by using at least one new loss created by referring to the new virtual next frame information and the predicted real next frame information.

As one example, if the loss is determined as not decreased for any of the previous calibrated parameters, the processor decreases the preset learning rate and performs said process (II-1), said process (II-2), and said process (II-3).

In accordance with still yet another aspect of the present disclosure, there is provided a learning device for learning a real state network capable of generating predicted next frame information corresponding to real action information on a real action performed in multiple pieces of real recent frame information by a deep learning-based device in a real environment, including: at least one memory that stores instructions; and at least one processor configured to execute the instructions to perform or support another device to perform: (I) if multiple pieces of trajectory information corresponding to multiple pieces of the real action information on the real action performed by the deep learning-based device in the real environment are acquired as training data, a process of generating multiple pieces of recent frame information for training by referring to k pieces of previous real frame information and real current frame information at a point of time in specific trajectory information, (II) a process of inputting into the real state network the multiple pieces of the recent frame information for training and action information for training which is acquired by referring to real current action information of the specific trajectory information at the point of the time, to thereby allow the real state network to apply its operation using prediction parameters to the multiple pieces of the recent frame information for training and the action information for training and thus to output the predicted next frame information, and (III) a process of updating the prediction parameters such that the loss is minimized, by using at least one loss created by referring to the predicted next frame information and real next frame information which is next to the real current frame information in the specific trajectory information.

As one example, at the process of (II), the processor performs (i) a process of inputting a current frame state sum for training created by concatenating the multiple pieces of the recent frame information for training into a convolutional neural network of the real state network, to thereby allow the convolutional neural network to output a 1-st feature by applying convolution operation to the current frame state sum for training and a process of inputting the action information for training into at least one fully connected layer of the real state network, to thereby allow said at least one fully connected layer to output a 2-nd feature by applying fully-connected operation to the action information for training and (ii) a process of inputting a concatenated feature created by concatenating the 1-st feature and the 2-nd feature into a deconvolutional layer, to thereby allow the deconvolutional layer to output the predicted next frame information by applying deconvolution operation to the concatenated feature.

As one example, the processor performs a process of instructing the convolutional neural network to output the current frame state sum for training, which is an H×W×(K+1) tensor created by concatenating the multiple pieces of the recent frame information for training which are H×W×C tensors, as the 1-st feature which is an HWC-dimension vector, a process of instructing said at least one fully connected layer to output the action information for training, which is a 3-dimension vector, as the 2-nd feature which is an L-dimension vector, and a process of instructing the deconvolutional layer to output a 1×1×(HWC+L) tensor, created by concatenating the 1-st feature and the 2-nd feature, as the predicted next frame information which is an H×W×C tensor.

As one example, the processor performs a process of updating at least one parameter of at least one of the convolutional neural network, said at least one fully connected layer, and the deconvolutional layer according to a gradient descent using the loss.

In addition, recordable media readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
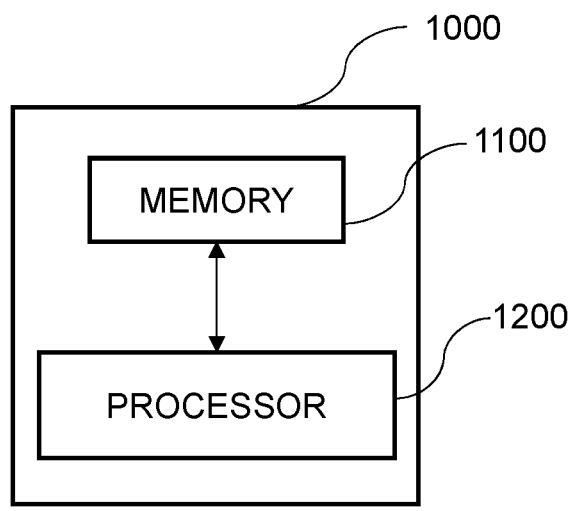
FIG. 1 is a drawing schematically illustrating a calibrating device for calibrating a physics engine of a virtual world simulator to be used for learning of a deep learning-based device in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a calibrating device for calibrating a physics engine of a virtual world simulator for learning a deep learning-based device in accordance with one example embodiment of the present disclosure. By referring to FIG. 1, the calibrating device 1000 may include a memory 1100 for storing instructions to calibrate the physics engine of the virtual world simulator for learning of the deep learning-based device and a processor 1200 for performing processes corresponding to the instructions in the memory 1100 to calibrate the physics engine of the virtual world simulator for learning of the deep learning-based device.

Specifically, the calibrating device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 2:
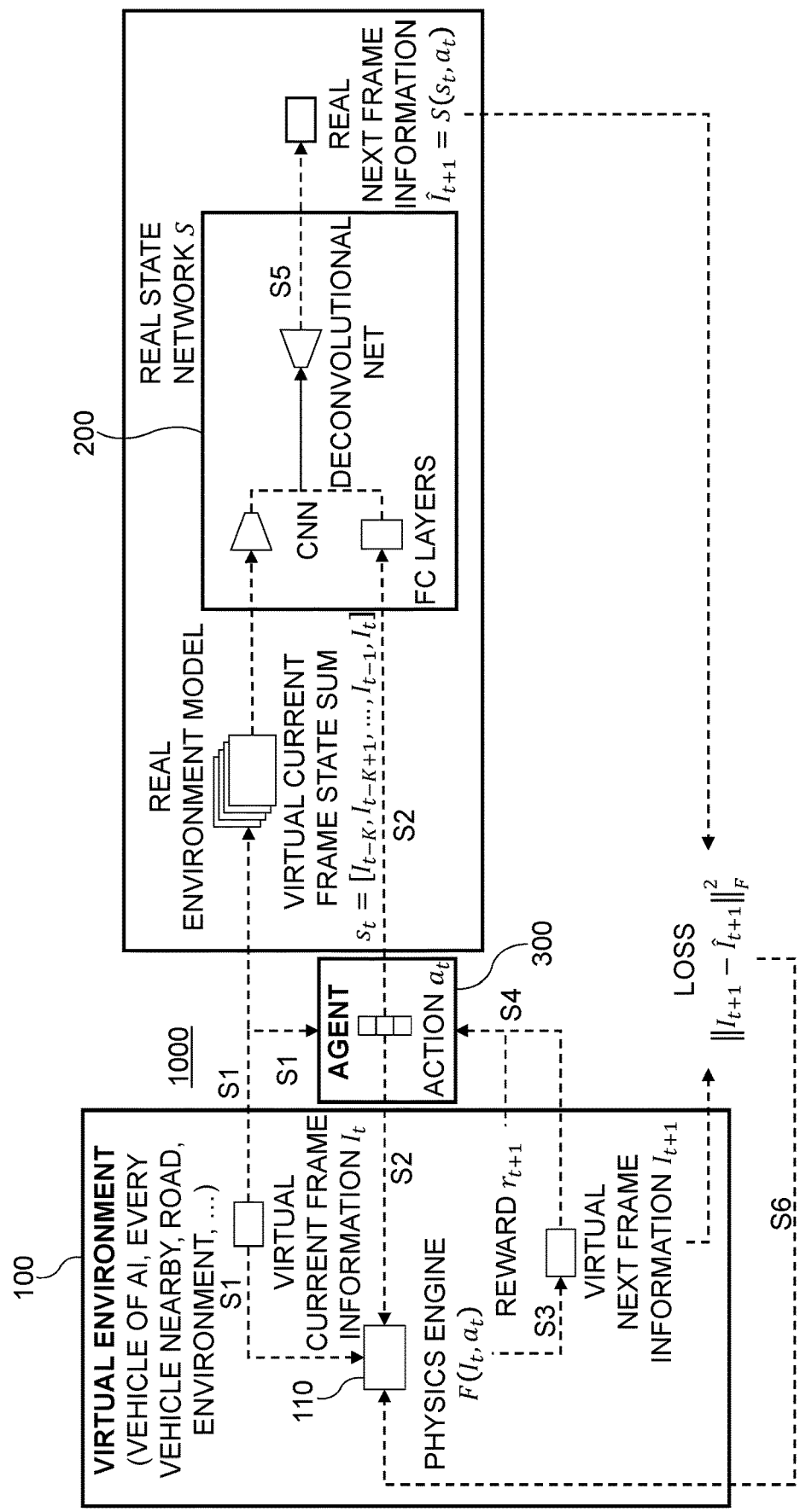
FIG. 2 is a drawing schematically illustrating a method for calibrating the physics engine of the virtual world simulator to be used for learning of the deep learning-based device in accordance with one example embodiment of the present disclosure.

A method for calibrating the physics engine of the virtual world simulator for learning of the deep learning-based device by using the calibrating device 1000 in accordance with one example embodiment of the present disclosure is described by referring to FIG. 2 as follows.

First, the virtual world simulator 100 may generate virtual current frame information $I_t$ corresponding to a virtual current state in a virtual environment predetermined for learning of the deep learning-based device 300, i.e., an agent. Herein, the virtual current state may include operating state information, surrounding environment information, operating conditions, etc. of the deep learning-based device 300, and the deep learning-based device 300 may include any device capable of operating according to conditions learned by deep learning algorithm, such as autonomous vehicles, autonomous airplanes, robots, etc. For example, if the deep learning-based device is an autonomous vehicle, the virtual current state may include various driving information such as autonomous vehicle information, surrounding vehicle information, road information, traffic signal information, the surrounding environment information, etc.

Next, if the virtual current frame information $I_t$ corresponding to the virtual current state in the virtual environment is acquired from the virtual world simulator 100, the calibrating device 1000 may transmit the acquired virtual current frame information $I_t$ to the deep learning-based device 300, to thereby allow the deep learning-based device 300 to apply its operation using previous learned parameters to the virtual current frame information $I_t$ and thus to output virtual action information $a_t$ corresponding to the virtual current frame information $I_t$ at a step of S2.

Also, the calibrating device 1000 may transmit the virtual current frame information $I_t$ acquired from the virtual world simulator 100 and the virtual action information $a_t$ outputted from the deep learning-based device 300 to the physics engine F 110 of the virtual world simulator 100, to thereby allow the physics engine F 110 to apply its operation using previous calibrated parameters to the virtual current frame information $I_t$ and the virtual action information $a_t$ and thus to output virtual next frame information $I_{t+1}$ corresponding to the virtual action information $a_t$ and the virtual current frame information $I_t$ at a step of S3.

In addition to this, the calibrating device 1000 may transmit the virtual current frame information $I_t$ acquired from the virtual world simulator 100 and the virtual action information $a_t$ outputted from the deep learning-based device 300 to the real state network 200, to thereby allow the real state network 200 to apply its operation using learned prediction parameters to the virtual action information $a_t$ and multiple pieces of virtual recent frame information corresponding to the virtual current frame information $I_t$ and thus to output predicted real next frame information $\hat{I}_{t+1}$ at a step of S5. That is, the real state network 200 may output next frame information predicted to happen in the real world by referring to the multiple pieces of the virtual recent frame information and the virtual action information. Throughout the present disclosure, the multiple pieces of the virtual recent frame information may be k+1 pieces of the virtual recent frame information, but the scope of the present disclosure is not limited thereto.

Herein, the real state network 200 may have been learned to output the multiple pieces of the predicted next frame information corresponding to the real action information on the real action in the multiple pieces of the real recent frame information performed by the deep learning-based device in the real environment, a process of which will be described in detail later. Throughout the present disclosure, the multiple pieces of the predicted next frame information may be k+1 pieces of the predicted next frame information, and the multiple pieces of the real recent frame information may be k+1 pieces of the real recent frame information, but the scope of the present disclosure is not limited thereto.

And, the calibrating device 100 may perform a process of transmitting the virtual current frame information and the virtual action information to the real state network 200, to thereby instruct the real state network 200 to generate the multiple pieces of the virtual recent frame information by referring to the virtual current frame information and k pieces of virtual previous frame information received beforehand. As another example, the calibrating device 1000 may generate the multiple pieces of the virtual recent frame information by referring to the virtual current frame information and the k pieces of the virtual previous frame information received beforehand, to thereby transmit the virtual recent frame information to the real state network 200.

That is, the calibrating device 1000 may perform a process of transmitting the virtual current frame information and the virtual action information to the real state network 200, to thereby instruct the real state network 200 to generate a virtual current frame state sum created by concatenating the virtual current frame information and the k pieces of the virtual previous frame information. As another example, the calibrating device 1000 may generate the virtual current frame state sum created by concatenating the virtual current frame information and the k pieces of the virtual previous frame information, to thereby transmit the virtual current frame state sum to the real state network 200.

Herein, the virtual current frame state sum $s_t$ may be represented as $[I_{t-K}, I_{t-K+1}, \ldots, I_{t-1}, I_t]$ and the predicted real next state $\hat{I}_{t+1}$ may be represented as $S(s_t, a_t)$.

Meanwhile, the real state network 200 may (i) (i-1) generate a 1-st dimension vector by applying convolution operation to the virtual current frame state sum $s_t$ and (i-2) generate a 2-nd dimension vector by applying fully-connected operation to the virtual action information, and (ii) generate the predicted real next frame information by applying deconvolution operation to a concatenation of the 1-st dimension vector and the 2-nd dimension vector.

Herein, the virtual current frame state sum $s_t$ may be an H×W×(K+1) tensor created by concatenating (i) the k pieces of the virtual previous frame information and (ii) the virtual current frame information which is an H×W×C tensor. Further, the 1-st dimension vector may be an HWC-dimension vector, and, supposing that the 2-nd dimension vector is an L-dimension vector, the predicted real next frame information may be an H×W×C tensor created by applying deconvolution operation to a 1×1×(HWC+L) tensor generated by concatenating the 1-st dimension vector and the 2-nd dimension vector. And, the virtual action information may be a 3-dimension vector, for example, if the deep learning-based device 300 is the autonomous vehicle, the virtual action information may correspond to [information on a degree of change in a steering angle, information on a pressure on a brake pedal, information on a pressure on an accelerator pedal].

Next, the calibrating device 1000 may perform a process of calibrating and optimizing the previous calibrated parameters of the physics engine F 110, such that at least one loss is minimized which is created by referring to the virtual next frame information outputted from the physics engine F 110 of the virtual world simulator 100 and the predicted real next frame information outputted from the real state network 200, to thereby generate current calibrated parameters as optimized parameters, at a step of S6. As a result, the physics engine F 110 may plan a virtual next frame where a gap between the virtual environment and the real environment is minimized.

That is, the calibrating device 1000 may calculate one or more losses $\|I_{t+1}-\hat{I}_{t+1}\|_F^2$ by referring to the virtual next frame information $I_{t+1}$ generated by the physics engine F 110 and the predicted real next frame information $\hat{I}_{t+1}$ generated by the real state network 200, or may instruct a loss layer to calculate the losses $\|I_{t+1}-\hat{I}_{t+1}\|_F^2$, and may optimize the physics engine F 110 by referring to the losses $\|I_{t+1}-\hat{I}_{t+1}\|_F^2$.

Meanwhile, if the physics engine F 110 of the virtual world simulator 100 is non-differentiable, the previous calibrated parameters may be optimized as follows.

That is, the calibrating device 1000 may perform (i) a process of selecting one previous calibrated parameter among the previous calibrated parameters of the physics engine F 110 and (ii) a process of calibrating the selected one previous calibrated parameter with a preset learning rate by using the loss, to thereby generate one current calibrated parameter as an optimized parameter. And, the calibrating device 1000 may repeat, until the loss decreases, (i) a process of instructing the physics engine F 110 to apply its operation using said one current calibrated parameter and a rest of the previous calibrated parameters excluding said one previous calibrated parameter to the virtual current frame information and the virtual action information, to thereby generate new virtual next frame information and (ii) a process of determining whether the loss decreases by using at least one new loss created by referring to the new virtual next frame information and the predicted real next frame information.

And, if the loss is determined as not decreased for any of the previous calibrated parameters, the calibrating device 1000 may decrease the preset learning rate and may perform the processes above.

Also, the calibrating device 1000 may perform a process of transmitting the virtual next frame information $I_{t+1}$ outputted from the physics engine F 110 and reward information $r_{t+1}$ corresponding to the virtual action information outputted from the deep learning-based device 300 to the deep learning-based device 300 at a step of S4, to thereby instruct the deep learning-based device 300 to update the previous learned parameters via on-policy reinforcement learning which uses the virtual next frame information $I_{t+1}$ and the reward information $r_{t+1}$. Herein, the reward information may be result representing whether the virtual action information is appropriate which is performed by the deep learning-based device 300 in response to the virtual current frame information, and the reward information may be generated by the physics engine F 110 or the calibrating device 1000.

Figure 3:
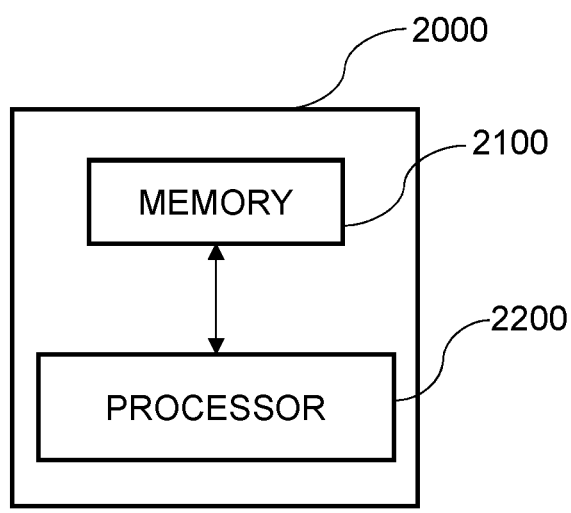
FIG. 3 is a drawing schematically illustrating a learning device for learning a real state network capable of generating predicted next frame information corresponding to real action information on a real action performed in multiple pieces of real recent frame information by the deep learning-based device in a real environment in accordance with one example embodiment of the present disclosure.

FIG. 3 is a drawing schematically illustrating a learning device for learning the real state network capable of generating the predicted next frame information corresponding to the real action information on the real action performed in the multiple pieces of the real recent frame information by the deep learning-based device in the real environment in accordance with one example embodiment of the present disclosure. By referring to FIG. 3, the learning device 2000 may include a memory 2100 for storing instructions to learn the real state network capable of outputting the predicted next frame information corresponding to the real action information on the real action performed in the multiple pieces of the real recent frame information by the deep learning-based device in the real environment and a processor 2200 for performing processes corresponding to the instructions in the memory 2100 to learn the real state network capable of outputting the predicted next frame information corresponding to the real action information on the real action performed in the multiple pieces of the real recent frame information by the deep learning-based device in the real environment.

Specifically, the learning device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software. The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 4:
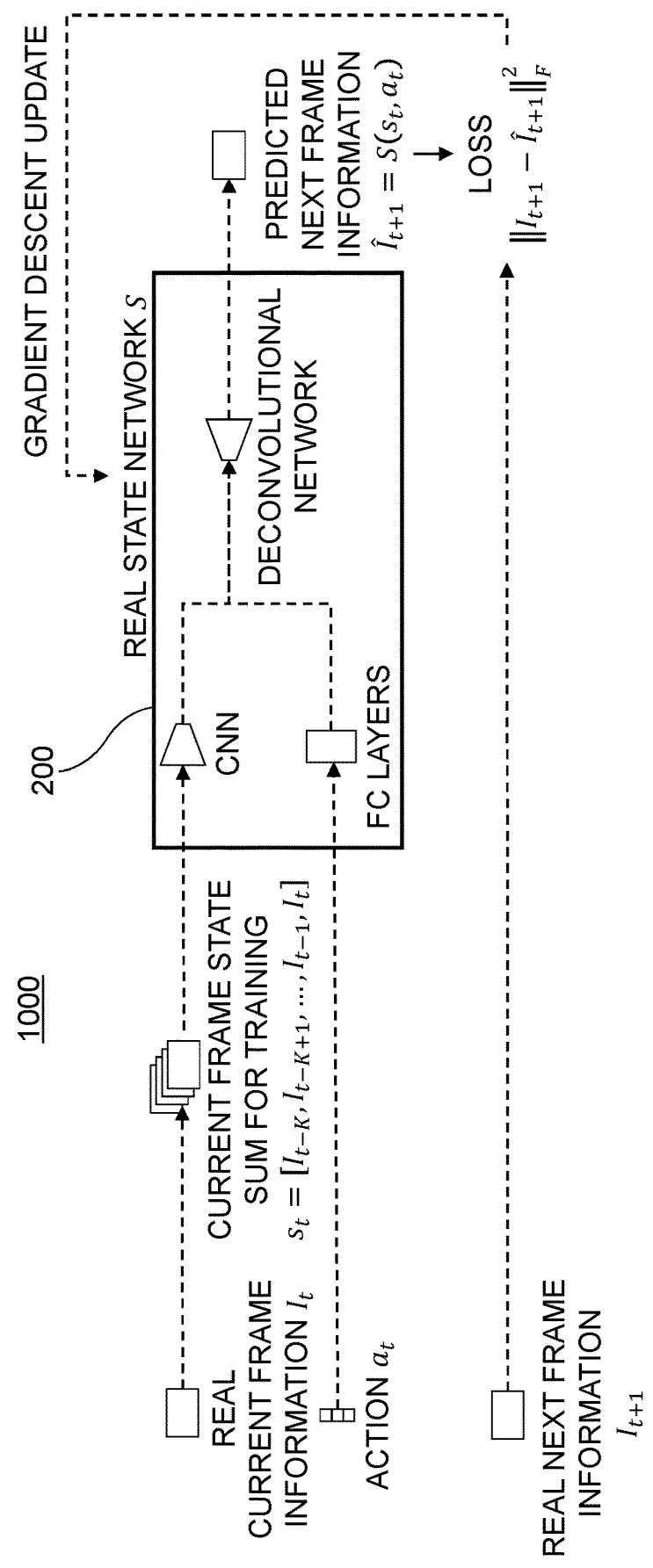
FIG. 4 is a drawing schematically illustrating a learning method for learning the real state network capable of generating the predicted next frame information corresponding to the real action information on the real action performed in the multiple pieces of the real recent frame information by the deep learning-based device in the real environment in accordance with one example embodiment of the present disclosure.

A method for learning of outputting the predicted next frame information corresponding to the real action information on the real action performed in the multiple pieces of the real recent frame information by the deep learning-based device in the real environment by using the learning device 2000 in accordance with one example embodiment of the present disclosure configured as such is described as follows by referring to FIG. 4. In the description below, the part easily deducible from the explanation of FIG. 2 will be omitted.

First, the learning device 2000 may acquire multiple pieces of trajectory information corresponding to multiple pieces of the real action information on the real action performed by the deep learning-based device in the real environment as training data.

Figure 5:
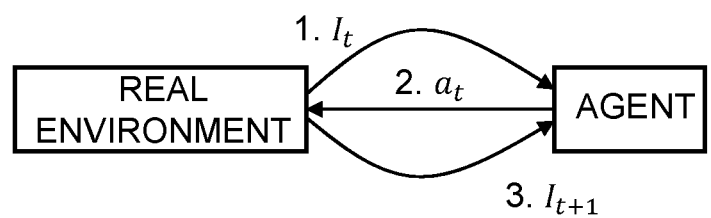
FIG. 5 is a drawing schematically illustrating a method for generating at least one trajectory for learning the real state network in accordance with one example embodiment of the present disclosure.

Herein, by referring to FIG. 5, N pieces of the trajectory information may be generated by the agent, which is the deep learning-based device, in various environments like the real environment, and the deep learning-based device may generate the N pieces of the trajectory information by repeating: (i) a process of creating the current frame $I_t$ which is information on the real environment, (ii) a process of creating the action $a_t$ corresponding to the current frame $I_t$, and (iii) a process of creating the next frame $I_{t+1}$ changed according to the action $a_t$. The N pieces of the trajectory information may be exemplarily represented as follows.

$$X_1 = I_1^{(1)}, a_1^{(1)}, I_2^{(1)}, a_2^{(1)}, \ldots, I_{T_1-1}^{(1)}, a_{T_1-1}^{(1)}, I_{T_1}^{(1)}$$

$$X_2 = I_1^{(2)}, a_1^{(2)}, I_2^{(2)}, a_2^{(2)}, \ldots, I_{T_2-1}^{(2)}, a_{T_2-1}^{(2)}, I_{T_2}^{(2)}$$

...

$$X_N = I_1^{(N)}, a_1^{(N)}, I_2^{(N)}, a_2^{(N)}, \ldots, I_{T_N-1}^{(N)}, a_{T_N-1}^{(N)}, I_{T_N}^{(N)}$$

Herein, each of lengths $T_1, \ldots, T_N$, each of starting points $I_1^{(1)}, \ldots, I_1^{(N)}$ of each of the N pieces of the trajectory information and action pattern $p(a_t|s_t)$ of the deep learning-based device, e.g., driving patterns of the autonomous vehicle, may be different.

And, the learning device 2000 may perform a process of generating multiple pieces of recent frame information for training by referring to k pieces of previous real frame information and real current frame information at a point of time in specific trajectory information among the multiple pieces of the trajectory information acquired as the training data.

Next, the learning device 2000 may perform a process of inputting into the real state network 200 the multiple pieces of the recent frame information for training and action information for training which is acquired by referring to real current action information of the specific trajectory information at the point of the time, to thereby allow the real state network 200 to apply its operation using prediction parameters to the multiple pieces of the recent frame information for training and the action information for training and thus to output the predicted next frame information.

As one example, the learning device 2000 may perform (i) a process of inputting a current frame state sum for training, created by concatenating the multiple pieces of the recent frame information for training, into a convolutional neural network of the real state network 200, to thereby allow the convolutional neural network to output a 1-st feature by applying convolution operation to the current frame state sum for training and (ii) a process of inputting the action information for training into at least one fully connected layer of the real state network 200, to thereby allow said at least one fully connected layer to output a 2-nd feature by applying fully-connected operation to the action information for training. And, the learning device 2000 may perform a process of inputting a concatenated feature created by concatenating the 1-st feature and the 2-nd feature into a deconvolutional layer, to thereby allow the deconvolutional layer to output the predicted next frame information by applying deconvolution operation to the concatenated feature.

Herein, the current frame state sum for training $s_t$ may be represented as $[I_{t-K}, I_{t-K+1}, \ldots, I_{t-1}, I_t]$ and the predicted next frame information $\hat{I}_{t+1}$ may be represented as $S(s_t, a_t)$.

That is, the learning device 2000 may perform (i) a process of instructing the convolutional neural network to output the current frame state sum for training, which is an H×W×(K+1) tensor created by concatenating the multiple pieces of the recent frame information for training which are H×W×C tensors, as the 1-st feature which is an HWC-dimension vector, (ii) a process of instructing said at least one fully connected layer to output the action information for training, which is a 3-dimension vector, as the 2-nd feature which is an L-dimension vector, and (iii) a process of instructing the deconvolutional layer to output a 1×1×(HWC+L) tensor, created by concatenating the 1-st feature and the 2-nd feature, as the predicted next frame information which is an H×W×C tensor.

Next, the learning device 2000 may perform a process of updating the prediction parameters such that the loss is minimized, by using at least one loss created by referring to the predicted next frame information and real next frame information which is next to the real current frame information in the specific trajectory information.

That is, the learning device 2000 may calculate one or more losses $\|I_{t+1} - \hat{I}_{t+1}\|_F^2$ by referring to the real next frame information $I_{t+1}$ of the specific trajectory information and the predicted next frame information $\hat{I}_{t+1}$ outputted from the real state network 200, or may instruct a loss layer to calculate the losses $\|I_{t+1} - \hat{I}_{t+1}\|_F^2$, and may learn the real state network 200 by referring to the losses $\|I_{t+1} - \hat{I}_{t+1}\|_F^2$.

Herein, the learning device 2000 may perform a process of updating the prediction parameters of the real state network 200 according to a gradient descent, for example, may update at least one parameter of at least one of the convolutional neural network, said at least one fully connected layer, and the deconvolutional layer.

And, the learning device 2000 may repeat the learning processes above by using N real world trajectories, such that the losses of the real state network 200 converge.

The present disclosure has an effect of more reliably applying short-term planning of the deep learning-based device learned in the virtual world to the real world, by calibrating the physics engine of the virtual world simulator to minimize the gap between the virtual world and the real world.

The present disclosure has another effect of utilizing losses between the physics engine and a real environment model as a reliability measure, for validating a reliability of a given virtual environment.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present disclosure has been explained by specific matters such as detailed components, limited embodiments, and drawings. They have been provided only to help more general understanding of the present invention. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for calibrating a physics engine of a virtual world simulator to be used for learning of a deep learning-based device, comprising:
   (a) if virtual current frame information corresponding to a virtual current state in a virtual environment is acquired from the virtual world simulator:
      (i) transmitting, by a calibrating device, the virtual current frame information to the deep learning-based device, wherein the transmitting of the virtual current frame information to the deep learning-based device instructs the deep learning-based device to apply its operation using previous learned parameters to the virtual current frame information and output virtual action information corresponding to the virtual current frame information, and wherein the deep learning-based device, in response to receiving the virtual current frame information from the calibrating device, applies the deep learning-based device operation using previous learned parameters to the virtual current frame information and outputs virtual action information corresponding to the virtual current frame information;
      (ii) transmitting, by the calibrating device, the virtual current frame information and the virtual action information to the physics engine of the virtual world simulator, wherein the transmitting of the virtual current frame information to the physics engine instructs the physics engine to apply its operation using previous calibrated parameters to the virtual current frame information and the virtual action information and to output virtual next frame information corresponding to the virtual current frame information and the virtual action information, wherein the physics engine, in response to receiving the virtual current frame information and the virtual action information, applies the physics engine operation using previous calibrated parameters to the virtual current frame information and the virtual information and outputs virtual next frame information corresponding to the virtual current frame information and the virtual action information; and
      (iii) transmitting, by the calibrating device, the virtual current frame information and the virtual action information to a real state network that has been trained to output multiple pieces of predicted next frame information in response to real action information on a real action performed in multiple pieces of real recent frame information by the deep learning-based device in a real environment, wherein the transmitting of the virtual current frame information and the virtual action information to the real state network instructs the real state network to apply its operation using learned prediction parameters to the virtual action information and multiple pieces of virtual recent frame information corresponding to the virtual current frame information and to output predicted real next frame information, wherein the real state network, in response to receiving the virtual current frame information and the virtual action information, applies the real state network operation using learned prediction parameters to the virtual action information and multiple pieces of the virtual recent frame information corresponding to the virtual current frame information and outputs predicted real next frame information; and
   (b) calibrating and optimizing, by the calibrating device, the previous calibrated parameters of the physics engine, such that at least one loss that is created by referring to the virtual next frame information and the predicted real next frame information is minimized, wherein the calibrating and optimizing generates current calibrated parameters as optimized parameters.

2. The method of claim 1, further comprising:
   (c) transmitting, by the calibrating device, the virtual next frame information and reward information corresponding to the virtual action information to the deep learning-based device, wherein the transmitting of the virtual next frame information and reward information instructs the deep learning-based device to update the previous learned parameters via on-policy reinforcement learning, and wherein the on-policy reinforcement learning uses the virtual next frame information and the reward information, and wherein the deep learning-based device, in response to receiving the virtual next frame information and reward information, updates the previous learned parameters via the on-policy reinforcement learning.

3. The method of claim 1, wherein the multiple pieces of the virtual recent frame information are generated by referring to the virtual current frame information and k pieces of virtual previous frame information received beforehand.

4. The method of claim 3, wherein, (iii), the real state network: generates a 1-st dimension vector by applying convolution operation to a virtual current frame state sum created by concatenating the virtual current frame information and the k pieces of the virtual previous frame information; generates a 2-nd dimension vector by applying fully-connected operation to the virtual action information; and generates the predicted real next frame information by applying deconvolution operation to a concatenation of the 1-st dimension vector and the 2-nd dimension vector.

5. The method of claim 4, wherein the virtual current frame state sum is an $H \times W \times (K+1)$ tensor created by concatenating (i) the k pieces of the virtual previous frame information and (ii) the virtual current frame information, and
   wherein the virtual current frame information is an $H \times W \times C$ tensor, and
   wherein the 1-st dimension vector is an HWC-dimension vector, and
   wherein the 2-nd dimension vector is an L-dimension vector, and wherein the predicted real next frame information is an H×W×C tensor created by applying deconvolution operation to a 1×1×(HWC+L) tensor generated by concatenating the 1-st dimension vector and the 2-nd dimension vector.

6. The method of claim 1, wherein, (b), the calibrating device repeats, until the loss decreases: (b-1) a flat process of selecting one previous calibrated parameter among the previous calibrated parameters; (b-2) a second process of calibrating the selected one previous calibrated parameter with a preset learning rate by using the loss, wherein the second process generates one current calibrated parameter as an optimized parameter; (b-3) a third process of instructing the physics engine to apply its operation using the one current calibrated parameter and a rest of the previous calibrated parameters excluding the one previous calibrated parameter to the virtual current frame information and the virtual action information, wherein the third process generates new virtual next frame information; and (b-4) a fourth process of determining whether the loss decreases by using at least one new loss created by referring to the new virtual next frame information and the predicted real next frame information.

7. The method of claim 6, wherein, if the loss is determined as not decreased for any of the previous calibrated parameters, the calibrating device decreases the preset learning rate and performs the first process, the second process, the third process, and the fourth process.

8. A method for learning a real state network capable of generating predicted next frame information corresponding to real action information on a real action performed in multiple pieces of real recent frame information by a deep learning-based device in a real environment, comprising steps of:
(a) if multiple pieces of trajectory information corresponding to multiple pieces of the real action information on the real action performed by the deep learning-based device in the real environment are acquired as training data, generating, by a learning device, multiple pieces of recent frame information for training by referring to k pieces of previous real frame information and real current frame information at a point of time in specific trajectory information;
(b) inputting into the real state network, by the learning device, the multiple pieces of the recent frame information for training and action information for training, wherein the action information for training is acquired by referring to real current action information of the specific trajectory information at the point of the time, and wherein the inputting allows the real state network to apply its operation using prediction parameters to the multiple pieces of the recent frame information for training and the action information for training and to output the predicted next frame information, and wherein the real network, in response to the inputting, applies the real state network operation using prediction parameters to the multiple pieces of the recent frame information for training and the action information for training and outputs the predicted next frame information; and
(c) updating, by the learning device, the prediction parameters such that at least one loss is minimized, wherein the at least one loss is created by referring to the predicted next frame information and real next frame information, and wherein the real next frame information is next to the real current frame information in the specific trajectory information.

9. The method of claim 8, wherein, at the step of (b), the learning device inputs a current frame state sum for training created by concatenating the multiple pieces of the recent frame information for training into a convolutional neural network of the real state network; and wherein the inputting of the current frame state sum allows the convolutional neural network to output a 1-st feature by applying a convolution operation to the current frame state sum for training; and wherein the convolutional neural network in response to the inputting of the current frame state sum for training, outputs the 1-st feature by applying the convolution operation to the current frame state sum for training; and wherein the learning device inputs the action information for training into at least one fully connected layer of the real state network; and wherein the inputting of the action information allows the at least one fully connected layer to output a 2-nd feature by applying a fully-connected operation to the action information for training; and wherein the at least one fully connected layer, in response to the inputting of the action information for training, outputs the 2-nd feature by applying the fully-connected operation to the action information for training; and wherein the learning device inputs a concatenated feature created by concatenating the 1-st feature and the 2-nd feature into a deconvolutional layer; and wherein the inputting of the concatenated feature allows the deconvolutional layer to output the predicted next frame information by applying a deconvolution operation to the concatenated feature; and wherein the deconvolutional layer, in response to the inputting of the concatenated feature, outputs the predicted next frame information by applying the deconvolution operation to the concatenated feature.

10. The method of claim 9, wherein the learning device instructs the convolutional neural network to output the current frame state sum for training, which is an H×W×(K+1) tensor created by concatenating the multiple pieces of the recent frame information for training which are H×W×C tensors, as the 1-st feature which is an HWC-dimension vector, and wherein the learning device instructs the at least one fully connected layer to output the action information for training, which is a 3-dimension vector, as the 2-nd feature which is an L-dimension vector, and wherein the learning device instructs the deconvolutional layer to output a 1×1×(HWC+L) tensor, created by concatenating the 1-st feature and the 2-nd feature, as the predicted next frame information which is an H×W×C tensor.

11. The method of claim 9, wherein the learning device updates one or more parameters of at least one of: the convolutional neural network, the at least one fully connected layer, or the deconvolutional layer, and wherein the updating is according to a gradient descent using the loss.

12. A calibrating device for calibrating a physics engine of a virtual world simulator to be used for learning of a deep learning-based device, comprising:
at least one memory that stores instructions; and
at least one processor configured to execute the instructions to perform:
(I) if virtual current frame information corresponding to a virtual current state in a virtual environment is acquired from the virtual world simulator,
(i) a process of transmitting the virtual current frame information to the deep learning-based device, wherein the transmitting of the virtual current frame information instructs the deep learning-based device to apply its operation using previous learned parameters to the virtual current frame information and output virtual action information corresponding to the virtual current frame information, and wherein the dean learning-based device, in response to receiving the virtual current frame information from the calibrating device, applies the deep learning-based device operation using previous learned parameters to the virtual current frame information and outputs virtual action information corresponding to the virtual current frame information;

(ii) a process of transmitting the virtual current frame information and the virtual action information to the physics engine of the virtual world simulator, wherein the transmitting of the virtual current frame information and the virtual action information to the physics engine instructs the physics engine to apply its operation using previous calibrated parameters to the virtual current frame information and the virtual action information and output virtual next frame information corresponding to the virtual current frame information and the virtual action information, and wherein the physics engine, in response to receiving the virtual current frame information and the virtual action information, applies the physics engine operation using previous calibrated parameters to the virtual current frame information and the virtual information and outputs virtual next frame information corresponding to the virtual current frame information and the virtual action information; and (iii) a process of transmitting the virtual current frame information and the virtual action information to a real state network that has been trained to output multiple pieces of predicted next frame information in response to real action information on a real action performed in multiple pieces of real recent frame information by the deep learning-based device in a real environment, wherein the transmitting of the virtual current frame information and the virtual action information to the real state network instructs the real state network to apply its operation using learned prediction parameters to the virtual action information and multiple pieces of virtual recent frame information corresponding to the virtual current frame information and output predicted real next frame information, wherein the real state network, in response to receiving the virtual current frame information and the virtual action information, applies the real state network operation using learned prediction parameters to the virtual action information and multiple pieces of the virtual recent frame information corresponding to the virtual current frame information and outputs predicted real next frame information; and (II) a process of calibrating and optimizing the previous calibrated parameters of the physics engine, such that at least one loss that created by referring to the virtual next frame information and the predicted real next frame information is minimized, wherein the calibrating and optimizing generates current calibrated parameters as optimized parameters.

13. The calibrating device of claim 12, wherein the processor further performs:

(III) a process of transmitting the virtual next frame information and reward information corresponding to the virtual action information to the deep learning-based device, wherein the transmitting instructs the deep learning-based device to update the previous learned parameters via on-policy reinforcement learning, and wherein the on-policy reinforcement learning uses the virtual next frame information and the reward information, and wherein the deep learning-based device, in response to receiving the virtual next frame information and reward information, updates the previous learned parameters via the on-policy reinforcement learning.

14. The calibrating device of claim 12, wherein the multiple pieces of the virtual recent frame information are generated by referring to the virtual current frame information and k pieces of virtual previous frame information received beforehand.

15. The calibrating device of claim 14, wherein, at the process of (iii), the real state network: generates a 1-st dimension vector by applying convolution operation to a virtual current frame state sum created by concatenating the virtual current frame information and the k pieces of the virtual previous frame information; generates a 2-nd dimension vector by applying fully-connected operation to the virtual action information; generates the predicted real next frame information by applying deconvolution operation to a concatenation of the 1-st dimension vector and the 2-nd dimension vector.

16. The calibrating device of claim 15, wherein the virtual current frame state sum is an H×W×(K+1) tensor created by concatenating (i) the k pieces of the virtual previous frame information and (ii) the virtual current frame information, and wherein the virtual current frame information is an H×W×C tensor, and wherein the 1-st dimension vector is an HWC-dimension vector, and wherein the 2-nd dimension vector is an L-dimension vector, and wherein the predicted real next frame information is an H×W×C tensor created by applying deconvolution operation to a 1×1×(HWC+L) tensor generated by concatenating the 1-st dimension vector and the 2-nd dimension vector.

17. The calibrating device of claim 12, wherein, at the process of (II), the processor repeats, until the loss decreases: (II-1) a first process of selecting one previous calibrated parameter among the previous calibrated parameters; (II-2) a second process of calibrating the selected one previous calibrated parameter with a preset learning rate by using the loss, wherein the second process generates one current calibrated parameter as an optimized parameter; (II-3) a third process of instructing the physics engine to apply its operation using the one current calibrated parameter and a rest of the previous calibrated parameters excluding the one previous calibrated parameter to the virtual current frame information and the virtual action information, wherein the third process generates new virtual next frame information; and (II-4) a fourth process of determining whether the loss decreases by using at least one new loss created by referring to the new virtual next frame information and the predicted real next frame information.

18. The calibrating device of claim 17, wherein, if the loss is determined as not decreased for any of the previous calibrated parameters, the processor decreases the preset learning rate and performs the first process, the second process, the third process, and the fourth process.

19. A learning device for learning a real state network capable of generating predicted next frame information corresponding to real action information on a real action performed in multiple pieces of real recent frame information by a deep learning-based device in a real environment, comprising:

at least one memory that stores instructions; and
at least one processor configured to execute the instructions to perform:
(I) if multiple pieces of trajectory information corresponding to multiple pieces of the real action information on the real action performed by the deep learning-based device in the real environment are acquired as training data, a process of generating multiple pieces of recent frame information for training by referring to k pieces of previous real frame information and real current frame information at a point of time in specific trajectory information;
(II) a process of inputting into the real state network the multiple pieces of the recent frame information for training and action information for training, wherein the action information for training is acquired by referring to real current action information of the specific trajectory information at the point of the time, and wherein the inputting allows the real state network to apply its operation using prediction parameters to the multiple pieces of the recent frame information for training and the action information for training and to output the predicted next frame information, and wherein the real state network, in response to the performing of the second process, (1) applies the real state network operation using prediction parameters to the multiple pieces of the recent frame information for training and the action information for training, and (2) outputs the predicted next frame information; and
(III) a third process of updating the prediction parameters such that at least one loss is minimized, wherein the at least one loss is created by referring to the predicted next frame information and real next frame information, and wherein the real next frame information is next to the real current frame information in the specific trajectory information.

20. The learning device of claim 19, wherein, at the process of (II), the processor performs:

a process of inputting a current frame state sum for training created by concatenating the multiple pieces of the recent frame information for training into a convolutional neural network of the real state network, wherein the inputting of the current frame state sum allows the convolutional neural network to output a 1-st feature by applying a convolution operation to the current frame state sum for training, and wherein the convolutional neural network, in response to the inputting of the current frame state sum, outputs the 1-st feature by applying the convolution operation to the current frame state sum for training;

a process of inputting the action information for training into at least one fully connected layer of the real state network, wherein the inputting of the action information allows the at least one fully connected layer to output a 2-nd feature by applying fully-connected operation to the action information for training, and wherein the at least one fully connected layer, in response to the inputting of the action information, outputs the 2-nd feature by applying the fully-connected operation to the action information for training; and a process of inputting a concatenated feature created by concatenating the 1-st feature and the 2-nd feature into a deconvolutional layer, wherein the inputting of the concatenated feature allows the deconvolutional layer to output the predicted next frame information by applying a deconvolution operation to the concatenated feature, and wherein the deconvolutional layer, in response to the inputting of the concatenated feature, outputs the predicted next frame information by applying the deconvolution operation to the concatenated feature.

21. The learning device of claim 20, wherein the processor performs: a process of instructing the convolutional neural network to output the current frame state sum for training, which is an $H \times W \times (K+1)$ tensor created by concatenating the multiple pieces of the recent frame information for training which are $H \times W \times C$ tensors, as the 1-st feature which is an HWC-dimension vector; a process of instructing the at least one fully connected layer to output the action information for training, which is a 3-dimension vector, as the 2-nd feature which is an L-dimension vector; and a process of instructing the deconvolutional layer to output a $1 \times 1 \times (HWC+L)$ tensor, created by concatenating the 1-st feature and the 2-nd feature, as the predicted next frame information which is an $H \times W \times C$ tensor.

22. The learning device of claim 20, wherein the processor performs a process of updating one or more parameters of at least one of: the convolutional neural network, the at least one fully connected layer, or the deconvolutional layer; and wherein the updating is according to a gradient descent using the loss.

* * * * *